United States Patent Office 3,337,543
Patented Aug. 22, 1967

3,337,543
NOVEL METHOD OF PREPARING
1,3-DIAZAPHENOTHIAZINES
Barbara Roth, Scarsdale, and George H. Hitchings, Yonkers, N.Y., assignors to Burroughs Wellcome & Co. (U.S.A.), Inc., Tuckahoe, N.Y., a corporation of New York
No Drawing. Filed Dec. 19, 1963, Ser. No. 331,903
Claims priority, application Great Britain, June 23, 1960, 21,951/60; Oct. 28, 1960, 37,224/60; Oct. 13, 1961, 36,922/61, 36,923/61; Sept. 12, 1962, 34,896/62; Nov. 6, 1963, 43,796/63
6 Claims. (Cl. 260—243)

This application is a continuation in part of U.S. patent application Ser. No. 123,342, filed June 5, 1961, now Patent No. 3,248,393, and U.S. patent application Ser. No. 229,211, filed Oct. 8, 1962, now abandoned.

The present invention provides a novel method of preparing diazaphenothiazines of the formula:

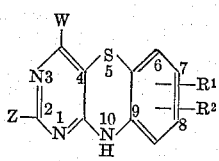

wherein W is selected from the class consisting of lower alkyl, hydroxy, amino, substituted amino and hydrogen, Z is selected from the class consisting of hydroxyl, mercapto, amino and substituted amino and $R^1$ and $R^2$ are selected from the class consisting of lower alkyl, halogen and hydrogen which comprises heating in dilute mineral acid at a temperature not substantially above 100° C. a compound of the formula

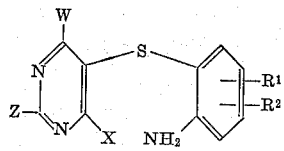

wherein X is selected from the class consisting of amino, monoalkylamino and hydroxyl, provided that when X is hydroxyl W is not amino, and recovering the product.

The compounds produced by this method possess antibacterial activity against a number of pathogenic microorganisms including Streptococcus faecalis, Escherichia coli, Staphylococcus aureus, Proteus vulgaris and Pseudomonas aeruginosa. The compounds are therefore useful as topical antibacterial agents for the control of superficial infections with the above and other susceptible microorganisms. The compounds may be applied as solutions, ointments and powders. Concentrations of the order of 1 mg./ml. (0.1%) are strongly antibacterial, however, since solutions do not produce tissue damage or irritation at much higher concentrations, the actual concentration employed for a given purpose may be as high as 2%, although the preferred concentration is generally in the range of 0.1–1%.

The compounds generally have depressant action of the tranquilizer type when given orally to mice. It will be observed that the diazaphenothiazine system is related to phenothiazine (from which are derived a number of known anti-histaminics and tranquilizers), to the purines and pyrimidines, of great metabolic importance, to the pteridines and to the isoalloxazines II, such as riboflavin (II, R=ribityl).

The present invention has two major variants. In the first the 1, 3-diazaphenothiazines of Formula I are produced by the ring closure of 5-(2-aminophenylthio)-4-hydroxypyrimidines of Formula II, by heating in dilute acid solution.

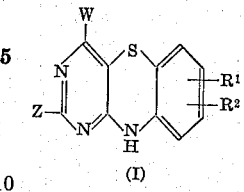 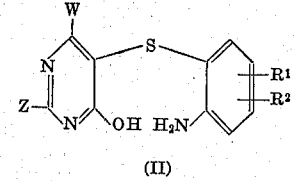

The 4-hydroxy-5-(o-aminophenylmercapto) pyrimidines, II, can be readily obtained by the reaction of an o-aminothiophenol with a 4-hydroxy-5-bromopyrimidine in alkaline solution.

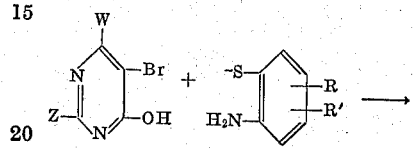

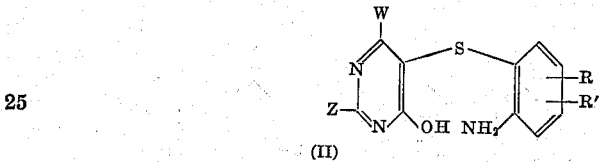

(II)

In these formulae, R, R' and W have the same values as above, and Z may be selected from the class consisting of the amino, alkylamino, dialkylamino, hydroxyl and mercapto groups.

The acid employed is conveniently hydrochloric acid but other strong acids such as sulfuric, phosphoric and perchloric acids are satisfactory. The solution may be aqueous or alcoholic or a mixture of the two. Acetic and formic acids are also satisfactory solvents. The concentration of acid is not especially critical except as regards the rate. There should be at least one equivalent of acid for each basic function. For a satisfactory rate, the pH of the reaction-mixture should be below 3 and preferably below 2. After one to eighteen hours (depending on the compound, the temperature and the pH) cyclization is effectively complete and the products are obtained in excellent yields. As a rule, heating at steam-bath temperatures is convenient and satisfactory. Using aqueous solutions, this results in temperatures in the range 90–100°. With largely alcoholic solvents, the temperature does not exceed the reflux temperature of the solvent (ca. 80° or ca. 70° when methanol is the solvent). At lower temperatures the reaction is lower but proceeds at a useful rate as low as 50°. If W is an amino group, this process tends to merge with the second variant wherefore mixtures of 4-hydroxy and 4-amino compounds are frequently obtained.

The substituents permissible in the benzenoid ring are such as do not interfere in the above processes and are not affected thereby. Halogen, lower alkyl groups and lower alkoxyl groups are obvious and acceptable values.

In the second variation of this method (Method 2), this surprisingly easy synthesis is extended by the discovery that a 1,3-diazaphenothiazine can be produced also by heating a 4-amino-5-(2-aminophenylthio) pyrimidine in acid solution. The conditions for this ring closure reaction are similar to those for the earlier method, but tend to be less drastic; for example, acidity may be less and reaction time shorter. The optimal acidity is obtained in 0.1–0.2 N mineral acid, which corresponds to a condition in which the pyrimidine moiety has acquired one proton while the amino group of the phenyl moiety is not entirely protonated. At still higher acid concentrations this amino group ceases to be available for substitution and little or no cyclization occurs. At lower acid concentrations cyclization is too slow, and side-reactions intervene to dominate the situation. For preparative purposes, heating at steam-bath temperatures (90–100°) is satisfactory and convenient. Temperatures above 100° offer no advantage and below about 50° reaction is usually impractically slow. However, in the special case wherein Y (of Formula IV) is a tertiary amino group—such as dimethylamino, piperidino, morpholino or piperazino—cyclization is unusually facile and may readily proceed at room temperature or even at 0° C. In some cases, replacement of part or all of the solvent water by lower alcohol, acetic or formic acid offers advantages. Further, as a relatively strong acid, formic acid may function both as solvent and acid catalyst (making mineral acid unnecessary). The nature of the mineral acid is not critical but hydrochloric acid is generally employed. Other non-oxidizing acids such as sulfuric or phosphoric acids at the same pH are equivalent and perchloric acid can also be used.

Thus, for example, a 1,3-diazaphenothiazine of Formula III may be produced by heating a 4-amino-5-(2-aminophenylthio)-pyrimidine of Formula IV in acid solution.

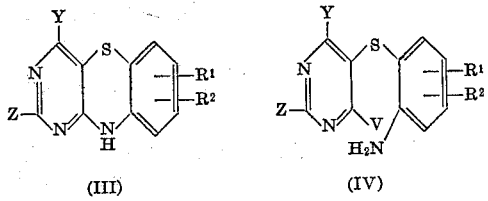

(III)  (IV)

In these formulae $R^1$, $R^2$ and Z are as defined above, V is an amino or substituted amino group and Y is an amino or substituted amino group or a hydrogen atom. The amino group V is lost during the ring closure, so the nature of substitutents if any on this amino group is unimportant provided that the group remains reactive in the ring closure reaction.

The groups V and Y are in equivalent positions in the pyrimidine of Formula IV; and consequently, when each is an amino or substituted amino group, there is a possibility of a mixture of products of Formula III being obtained on ring closure. However, when one of V and Y is an amino group and the other is a substituted amino group, it is the former that is lost during ring closure, giving a product of Formula III in which Y is a substituted amino group.

METHOD 1

Example 1

A mixture of 16 g. 2-amino-5-o-aminophenylthio-4-hydroxy pyrimidine, 320 ml. 95% ethanol and 32 ml. concentrated hydrochloric acid was heated on the steam bath under reflux for six hours. A clear yellow solution was formed, which upon cooling yielded a heavy yellow crystalline precipitate. This was isolated and recrystallized from alcohol with the addition of a little hydrochloric acid. There was thus obtained 2-amino-1,3-diazaphenothiazine hydrochloride, melting at 236–238°, with an ultraviolet absorption spectrum showing maxima in 0.1 N-hydrochloric acid at 240, 269, shoulder 280 and 380 m$\mu$, and at pH 11 at 240 and 318 m$\mu$.

Example 2

A mixture of 19.1 g. 5-bromouracil, 12.5 g. o-aminobenzenethiol, 13.8 g. anhydrous potassium carbonate, and 175 ml. ethylene glycol was heated to 150° under nitrogen for two hours. After cooling, the mixture was then poured into several volumes of ice water, clarified, and neutralized. The resultant precipitate was isolated, and extracted with warm ethanol to remove yellow impurities. There was thus obtained 5-o-aminophenylthio-2,4-dihydroxypyrimidine, melting at 247–249°.

To this pyrimidine (14.7 g.) was added 300 ml. ethanol and 30 ml. concentrated hydrochloric acid. The mixture was heated on the steam bath under reflux for 16 hours, resulting in the precipitation of a yellow matte of needles consisting of 2-hydroxy-1,3-diazaphenothiazine. This substance may be purified as the sodium salt by dissolving in hot dilute sodium hydroxide plus a little ethanol. On cooling it crystallized as fine yellow needles. The substance did not melt below 380°. It had ultraviolet absorption maxima at 265, 305, and 405 m$\mu$ in 0.1 N-hydrochloric acid, and at 245 and 310 m$\mu$ in pH 11 buffer.

Example 3

20 g. 2-dimethylamino-4-hydroxy-6-methylpyrimidine was dissolved in 300 ml. glacial acetic acid, and to this was slowly added a solution of 6.76 ml. bromine in 100 ml. glacial acetic acid. A precipitate of 5-bromo-2-dimethylamino-4-hydroxy-6-methylpyrimidine hydrobromide separated. This was isolated and converted to the *free base* in water, by the addition of sodium hydroxide. The melting point was then 232–233°.

A mixture of 11.59 g. 2-dimethylamino-4-hydroxy-5-bromo-6-methylpyrimidine, 6.25 g. o-aminobenzenethiol, 6.9 g. potassium carbonate, and 85 ml. ethylene glycol was heated under nitrogen to 140° for two hours. After cooling, the reaction mixture was poured into water, clarified, and neutralized. The precipitated product was isolated and recrystallized from ethanol, yielding long needles of 5-o-aminophenylthio-2-dimethylamino-4-hydroxy-6-methylpyrimidine melting at 216°.

A 4.4 g. sample of this pyrimidine was heated on the steam bath for two hours with 90 ml. ethanol and 9 ml. hydrochloric acid. On cooling, a yellow crystalline product separated, which was recrystallized from ethanol. The substance, 2-dimethylamino-4-methyl-1,3-diazaphenothiazine hydrochloride, M.P. 218–220°, had ultraviolet absorption maxima at 248, 281 and 380 m$\mu$ in 0.1 N-hydrochloric acid, and at 253, 312 and 340 m$\mu$ at pH 11.

Example 4

A mixture of 46 g. of 2-methylthiouracil and 36 g. of N-methylpiperazine was heated at 150° for three hours, which yielded a clear solution from which methylmercaptan was evolved. Upon cooling, the product solidified. It was ground and washed with ether, followed by recrystallization first from absolute ethanol and then from ethyl acetate. There was thus obtained 2-(4-methylpiperazino)-4-hydroxy-pyrimidine, melting at 185–186°. This product was brominated in glacial acetic acid, as described in Example 3, which precipitated 2-(4'-methylpiperazino)-4-hydroxy-5-bromopyrimidine hydrobromide; this melted at 280–282° (dec.) after recrystallization from ethanol.

A mixture of 53.1 g. of the above pyrimidine hydrobromide salt, 31.2 g. potassium carbonate, 18.8 g. of o-aminothiophenol, 240 ml. of water, and 240 ml. ethanol was heated on the steam bath for 2.5 hours. Upon cooling, a yellow precipitate of o,o'-diaminodiphenyl disulfide separated, which was filtered off. The filtrate was distilled to dryness under vacuum. A mixture of 450 ml. of ethanol and 60 ml. of concentrated hydrochloric acid was added to the residue, and the resultant solution was heated under reflux for 20 hours. Upon chilling, a greenish-yellow precipitate separated. This was slurried in warm dilute hydrochloric acid, and filtered from a small amount of insoluble material. The solution was then made alkaline with sodium hydroxide, which precipitated a greenish gum. This was separated and washed with repeated portions of ice water, at which point it solidified. After three recrystallizations from 50% ethanol with the aid of decolorizing charcoal there was obtained 2-(4'-methylpiperazino)-1,3-diazaphenothiazine, melting at 141°. The substance had ultraviolet absorption maxima at 245, 276, and 385 m$\mu$ in 0.1 N HCl, and at 253 and 322 m$\mu$ in 95% ethanol.

Example 5

A mixture of 35.4 g. of 2-(4'-methylpiperazino)-4-hydroxy-5-bromopyrimidine hydrobromide, 34 g. potassium carbonate, 19.6 g. 2-amino-4-chlorothiophenol hydrochloride, and 340 ml. of 50% ethanol was heated under reflux for 2.5 hours. Upon cooling, a precipitate formed which appeared to be a mixture of yellow and white products. This was isolated and slurried in dilute sodium hydroxide; the yellow material remained insoluble, and was filtered off and discarded. The solution was neutralized, yielding a white precipitate. Upon recrystallization from ethanol, there was obtained 2-(4'-methylpiperazino)-4-hydroxy-5 - (2" - amino - 4" - chlorophenylthio) pyrimidine, melting at 226–228°.

Eleven grams of the above product was mixed with 250 ml. of ethanol and 12 ml. of concentrated hydrochloric acid, and heated on the steam bath for 17 hours. A heavy yellow precipitate formed. This was isolated and dissolved in warm dilute hydrochloric acid, followed by filtration from a small amount of insoluble material. Upon neutralization, a pale yellow precipitate was formed, which was purified by recrystallization from ethanol, with the aid of decolorizing charcoal. There was thus obtained 2-(4'-methylpiperazino)-8-chloro-1,3-diazaphenothiazine, melting at 201–203°. The substance had ultraviolet absorption maxima at 249, 277, and 390 m$\mu$ in 0.1 N HCl, and at 256 and 326 m$\mu$ in 95% ethanol.

Example 6

Using procedures described in Example 4, there was prepared 2-(4'-methylpiperazino)-4-hydroxy - 6 - methylpyrimidine, by reacting 6-methyl-2-methylthiouracil with N-methylpiperazine. The product melted at 154–155° after recrystallization from ethyl acetate. Upon bromination as described in Example 3, there was obtained 2-(4'-methylpiperazino)-4-hydroxy-5-bromo - 6 - methylpyrimidine hydrobromide, which melted at 274–275° (dec.) after recrystallization from water.

Following the procedure of Example 4, the above pyrimidine was reacted with o-aminothiophenol, followed by cyclization with acid. The product was isolated as the free base, followed by conversion to the hydrochloride salt and crystallization from ethanol. There was thus obtained 2-(4'-methylpiperazino)-4-methyl - 1,3 - diazaphenothiazine dihydrochloride dihydrate, which melted at 274–274.5° (dec.). The substance had ultraviolet absorption maxima at 247, 275 and 385 m$\mu$ in 0.1 N HCl and at 253 and 324 m$\mu$ in pH 11 buffer.

Example 7

Using the method of Example 4, 2-methylthiouracil was reacted with dimethylaminopropylamine. The glassy product was brominated in glacial acetic acid, yielding 2-(3'-dimethylaminopropylamino)-4-hydroxy-5 - bromopyrimidine hydrobromide monohydrate, which melted at 128–129° after recrystallization from ethanol.

Again using the procedure of Example 4, the product was reacted with o-aminothiophenol in the presence of potassium carbonate, yielding a syrupy product which was cyclized with hydrochloric acid in ethanol. The product was isolated as the free base, obtained as a gum which slowly crystallized. Upon recrystallization from 50% ethanol there was obtained 2-(3'-dimethylaminopropylamino)-1,3-diazaphenothiazine, melting at 133–134°. The substance had ultraviolet absorption maxima at 242.5, 275 and 385 m$\mu$ in 0.1 N HCl, and at 245 and 317.5 m$\mu$ at pH 11.

Example 8

From the reaction of 2-methylthiouracil and piperidine, according to the method of Example 4, there was obtained 2-piperidino-4-hydroxypyrimidine, which melted at 156–157° after recrystallization from ethyl acetate, followed by sublimation. By bromination in glacial acetic acid, followed by conversion of the resultant salt to the free base and recrystallization from 50% ethanol, there was obtained 2-piperidino-4-hydroxy-5-bromopyrimidine, which melted at 201–202°. This product was treated with o-aminothiophenol according to the technique of Example 4, followed by cyclization with acid to produce 2-piperidino-1,3-diazaphenothiazine, which melted at 142–144° after recrystallization from 95% ethanol.

Example 9

2-methylthiouracil was treated with morpholine, following the technique of Example 4, to produce 2-morpholino-4-hydroxypyrimidine, which melted at 169–170° after recrystallization from a 60:40 hexane-ethanol mixture. Upon bromination as before followed by recrystallization of the product from ethanol, there was obtained the free base, 2-morpholino-4-hydroxy - 5 - bromopyrimidine, which melted at 238–241°. This was treated with o-aminothiophenol as in Example 4, followed by cyclization in acid, to yield 2-morpholino-1,3-diazaphenothiazine, which melted at 177–179° after recrystallization from ethanol.

Example 10

A mixture of 13.1 g. of 2-morpholino-4-hydroxy-5-bromopyrimidine, 10.4 g. of potassium carbonate, 9.8 g. of 2-amino-4-chlorothiophenol hydrochloride, 125 ml. ethanol and 80 ml. of water was heated under reflux for four hours, filtered from a small inorganic precipitate, and chilled. Upon chilling, yellow crystals consisting of the disulfide of the mercaptan separated. These were filtered off, and the filtrate was concentrated and diluted with water, followed by neutralization, which precipitated a grayish-white product. This was reprecipitated from alkaline solution, followed by recrystallization from 95% alcohol. There was thus obtained as a monohydrate 2-morpholino-4-hydroxy-5-(2'-amino-4' - chlorophenylthio)pyrimidine, which melted at 237–239°. This substance had a slight ultraviolet absorption maximum at 240 m$\mu$ and a shoulder at 288 m$\mu$ in 0.1 N HCl, and a slight maximum at 249 m$\mu$ and a maximum at 301 m$\mu$ at pH 11. Eight grams of this product was mixed with 200 ml. of ethanol and 6 ml. of concentrated hydrochloric acid, and heated on the steam bath for 17 hours. The hot solution was filtered from a slight precipitate and chilled, which resulted in the separation of a bright yellow precipitate. This was filtered off and slurried in dilute sodium hydroxide, which yielded a pale yellow insoluble material. Upon recrystallization from ethanol there was obtained 2-morpholino-8-chloro-1,3-diazaphenothiazine, which melted at 193°. This product had ultraviolet absorption maxima at 252, 282, and 390 m$\mu$ in 0.1 N HCl, and at 255 and 325 m$\mu$ in 95% ethanol.

Example 11

6-methyl-2-methylthiouracil was treated with morpholine as in Example 4, to yield 2-morpholino-4-hydroxy-6-methylpyrimidine, which melted at 223–226° after sublimation. Upon reaction with bromine in glacial acetic acid, there was formed 2-morpholino-4-hydroxy-5-bromo-6-methylpyrimidine, which melted at 240–243° after recrystallization from ethanol. Upon treatment with 2-amino-4-chlorothiophenol as in Example 10, there was obtained 2-morpholino-4-hydroxy-5-(2'-amino - 4' - chlorophenylthio)-6-methylpyrimidine, which melted at 228° after recrystallization from ethanol. This was cyclized with acid as in Example 10, thus producing 2-morpholino-4-methyl-8-chloro-1,3 - diazaphenothiazine, which melted at 234° after recrystallization from ethanol. This substance had ultraviolet absorption maxima at 251, 283, and 385 m$\mu$ in 0.1 N HCl, and at 257 and 327 m$\mu$ in 95% ethanol.

Example 12

2-piperidino-4-hydroxy-5-bromopyrimidine was treated with 2-amino-4-chlorothiophenol as described in Example 10 to produce 2-piperidino-4-hydroxy-5 - (2' - amino - 4'-chlorophenylthio)pyrimidine, which was purified by reprecipitating twice from alkaline solution, followed by recrystallizaiton from ethanol. It then melted at 226–228°, and had the following ultraviolet absorption spectrum: in 0.1 N HCl, there was a shoulder at 235 m$\mu$ and a slight maximum at 285 m$\mu$; at pH 11 there was maxima at 252 and 303 m$\mu$. This product was cyclized as in Example 10, which yielded 2-piperidino-8-chloro-1,3-diazaphenothiazine, melting at 165–167° after recrystallization from ethanol. The product had ultraviolet absorption maxima at 255, 291, and 385 m$\mu$ in 0.1 N HCl, and at 231, 257, and 325 m$\mu$ in 95% ethanol.

Example 13

2-piperidino-4-hydroxy-6-methylpyrimidine was brominated according to the technique of Example 3, which produced 2-piperidino-4-hydroxy-5-bromo-6 - methylpyrimidine, melting at 242–243° after recrystallization from ethanol. This compound was reacted with 2-amino-4-chlorothiophenol, following the method of Example 10, to produce 2-piperidino-4-hydroxy-5-(2'-amino-4'-chlorophenylthio)-6-methylpyrimidine, which crystallized from the reaction mixture. It was purified by precipitating from alkaline solution, followed by recrystallization from ethanol, and then melted at 218–220°. The ultraviolet absorption spectrum had the following characteristics: in 0.1 N HCl, there were shoulders at 239 and 280 m$\mu$; at pH 11, there were maxima at 256 and 302.5 m$\mu$. This compound was cyclized as in Example 10, which precipitated the bright yellow hydrochloride salt of 2-piperidino-4-methyl-8-chloro-1,3-diazaphenothiazine. This melted at 219–221° after recrystallization from ethanol, and had ultraviolet absorption maxima at 255, 285, and 385 m$\mu$ in 0.1 N HCl, and at 232, 258, and 325 m$\mu$ at pH 11.

Example 14

A mixture of 63.3 g. of 5-bromouracil, 65.3 g. of 2-amino-4-chlorothiophenol hydrochloride, 69 g. of potassium carbonate, and 475 ml. of ethylene glycol was slowly heated to 120° in an atmosphere of nitrogen, and held at this temperature for one hour. After cooling, the product was poured into several volumes of water, thus precipitating the disulfide of the mercaptan. The mixture was filtered, and the filtrate neutralized with acetic acid. The resultant precipitate was filtered off and washed well with ethanol. It was then reprecipitated twice from alkali, followed by recrystallization from ethylene glycol monomethyl ether, thus producing 2,4-dihydroxy-5-(2'-amino-4'-chlorophenylthio)-pyrimidine, which had a slight ultraviolet absorption maximum at 274 m$\mu$ at pH 1, and 299 m$\mu$ at pH 11. Seventeen grams of this product was mixed with 385 ml. ethanol plus 38.5 ml. of concentrated hydrochloric acid, and heated on the steam bath for 16 hours. At first a white precipitate was present, but this gradually turned yellow. The mixture was cooled and filtered, and the precipitate was then extracted with warm dilute sodium hydroxide, in which the product was quite insoluble, despite the fact that it contained a hydroxyl group; however, residual starting material dissolved, and was thus removed. This extraction was repeated, and the insoluble portion washed well then with water and ethanol. There was thus obtained 2-hydroxy-8-chloro-1,3-diazaphenothiazine, which had ultraviolet absorption maxima at 239, 255 (shoulder), 265, and 305 m$\mu$ in ethanol.

Example 15

A mixture of 2.2 g. 5-bromo-2-thiouracil, 2.76 g. potassium carbonate, 1.3 g. 2-aminothiophenol, and 20 ml. of ethylene glycol was heated to 140° for one hour, poured in water, extracted with ether, and the aqueous fraction neutralized with acetic acid. A light gray precipitate separated, which was isolated and washed with ethanol. The product was then mixed with 5 ml. of ethanol and 0.15 ml. of concentrated hydrochloric acid, and refluxed for 21 hours. A yellow precipitate was obtained, which was isolated and washed well with water, ethanol, and ether. There was obtained 2-mercapto-1,3-diazaphenothiazine, which melted at 272–274° (dec.). This product had an ultraviolet absorption maximum at 274 m$\mu$ and a bend out at 310 m$\mu$ with slight shoulder at 340 m$\mu$, in pH 11 buffer.

Example 16

Fifteen grams of 2-dimethylamino-4-hydroxy-6-aminopyrimidine was slurried in 350 ml. of carbon tetrachloride, and 5 ml. of bromine in 100 ml. of carbon tetrachloride was added dropwise to the well-stirred suspension. The bromine was taken up quite rapidly, despite the insolubility of the pyrimidine. The product was filtered off and purified by dissolving in water, treating with charcoal, clarifying, and neutralizing with sodium bicarbonate, which yielded a white precipitate. This was then recrystallized from water, yielding 2-dimethylamino-4-hydroxy-5-bromo-6-aminopyrimidine; melting point, 232–234° (dec.). This product (11.6 g.) was mixed with 4.2 g. of sodium bicarbonate, 6.25 g. of o-aminothiophenol, and 200 ml. of 50% ethanol, and heated on the steam bath for four hours. At first, a clear solution was present, which soon deposited a cream-colored precipitate. The mixture was cooled, and the product isolated and washed well with ethanol to remove small quantities of disulfide. It was purified by recrystallization from cellosolve, to give 2-dimethylamino-4-hydroxy - 5 - (2' - aminophenylthio)-6-aminopyrimidine, melting at 275–280°. A 5.5 g. sample of this product was mixed with 100 ml. of ethanol, 25 ml. water, and 3.3 ml. of concentrated hydrochloric acid, and heated on the steam bath for 19 hours. A yellow precipitate was formed, which was isolated and extracted with alkali. Part of the product was alkali-soluble. The two fractions were separated by filtration, and reconverted to the hydrochloride salts, which were then recrystallized from ethanol. There were thus obtained the hydrochlorides of 2-dimethylamino-4-amino-1,3-diazaphenothiazine and 2-dimethylamino-4-hydroxy-1,3-diazaphenothiazine, respectively.

Example 17

2-(4'-methylpiperazino) - 4 - hydroxy - 5 - bromo - 6-methyl-pyrimidine hydrobromide was reacted with 2-amino-4-chlorothiophenol in the presence of potassium carbonate according to the procedure of Example 4. The solvent was partially removed under vacuum, and the residue chilled, which resulted in the precipitation of a mixture of yellow and white solids. After isolation, the mixture was extracted with dilute sodium hydroxide. Neutralization of the soluble fraction yielded a white precipitate, which after recrystallization from ethanol yielded 2-(4'-methylpiperazino)-4-hydroxy-5-(2"-amino-4" - chlorophenylthio) - 6 - methylpyrimidine as white needles melting at 229–232°. The substance had the following ultraviolet absorption characteristics: in 0.1 N HCl, there were shoulders at 245 and 290 m$\mu$, and at pH 11 there were maxima at 254 and 298 m$\mu$. The pyrimidine (54 g.) was then cyclized in 1500 ml. ethanol containing 75 ml. of concentrated hydrochloric acid by heating for 20 hours. The solution was distilled to dryness, and the residue treated with dilute sodium hydroxide, which yielded a greenish-yellow solid. This could be purified by recrystallization from dilute ethanol, which yielded 2-(4'-methylpiperazino)-4-methyl-8-chloro - 1,3 - diazaphenothiazine, melting at 135–136°. Ultraviolet absorption maxima were at 248, 278, and 385 m$\mu$ in 0.1 N HCl, and at 258 and 325 m$\mu$ in 95% ethanol.

Example 18

2-amino-4,6-dihydroxy-5-bromopyrimidine was treated with o-aminothiophenol according to the procedure of Example 4 to produce 2-amino - 4,6 - dihydroxy-5 - (2'-aminophenylthio)-pyrimidine. This product (5 g.) was cyclized by heating for 24 hours in a mixture of 100 ml.

ethanol and 5 ml. concentrated hydrochloric acid. The precipitate present at the end of this time was filtered off, and found to be a mixture of cyclized and uncyclized pyrimidines. The yellow filtrate was concentrated to remove solvent. A yellow precipitate then separated, which was recrystallized from ethanol plus HCl, yielding 2-amino-4-hydroxy - 1,3 - diazaphenothiazine hydrochloride. This substance had an ultraviolet absorption maximum at 255 m$\mu$, a bend out at 295, shoulder at 310, and a slight maximum at 370 m$\mu$ in 0.1 N HCl, and a maximum at 256 m$\mu$ and bend out at 295 m$\mu$ in pH 11 buffer.

*Example 19*

2,4-diamino-5-bromo-6-hydroxypyrimidine was reacted with o-aminothiophenol according to the procedure of Example 4, to produce 2,4-diamino-5-(2'-aminophenylthio)-6-hydroxy-pyrimidine, which melted at 281–284° (dec.) after reprecipitation from alkali and extraction with ethanol to remove byproducts. This substance was cyclized by heating 2.5 g. in 60 ml. of 0.33 N hydrochloric acid for three hours. The solution yielded a yellow precipitate on cooling, which turned green in the presence of air. The product was soluble in alkali and proved to be a mixture of hydroxy- and aminohydroxy-diazaphenothiazines.

METHOD 2

*Example 20*

A mixture of 20.4 g. 2,4,6-triamino-5-bromopyrimidine, 19.6 g. 2-amino-4-chlorobenzenethiol hydrochloride, 14 g. potassium carbonate, and 200 ml. ethylene glycol was heated at 120° in an atmosphere of nitrogen for 1.5 hours. After cooling, the mixture was poured into water and yielded a pale yellow precipitate. This was isolated and extracted with warm ethanol to remove 2,2'-diamino-4,4'-dichlorodiphenyldisulphide. The light grey residue was then dissolved in hot 10% acetic acid and cooled, precipitating the white acetate salt of 2,4,6-triamino-5-(2-amino-4-chlorophenylthio)pyrimidine. This was recrystallized from water with the aid of decolorizing charcoal, and the free base was then precipitated from hot aqueous solution by the addition of sodium hydroxide. This base had M.P. 252–255° and ultraviolet absorption maxima at 250 m$\mu$ (22800) and 270 m$\mu$ (shoulder, 20100) in 0.1 N hydrochloric acid, at 255 m$\mu$ (16200), at 27 m$\mu$ (shoulder, 14100), and 305 m$\mu$ (5600) at pH 11.

A mixture of 1 g. 2,4,6-triamino-5-(2-amino-4-chlorophenylthio)pyrimidine, 10 ml. glacial acetic acid, 25 ml. water, and 4 ml. 5 N hydrochloric acid was heated for 15 hours on the steam bath. A clear yellow solution was formed. On chilling, a very small precipitate separated, which was filtered off. The filtrate was neutralized, yielding a yellow precipitate, which was filtered off and slurried in dilute sodium hydroxide. A small amount of side product dissolved. The insoluble product was filtered off, washed with water, and recrystallized from dilute ethanol, thus yielding 2,4-diamino - 8 - chloro-1,3-diazaphenothiazine, M.P. 281–283°. This product had ultraviolet absorption maxima at 259 m$\mu$ (28800), 290 m$\mu$ (6700) and a shoulder at 330 m$\mu$ in 95% ethanol, and maxima at 262 m$\mu$ (28800), 295 m$\mu$ (6700), and 280 m$\mu$ (1600) at pH 1.

*Example 21*

A mixture of 20.4 g. 2,4,6-triamino-5-bromopyrimidine, 12.5 g. 2-aminobenzenethiol, 7 g. potassium carbonate, and 250 ml. of ethylene glycol was treated by the procedure of Example 20 to produce 2,4,6-triamino-5-(2-aminophenylthio)pyrimidine, M.P. 217–219°.

A mixture of 5 g. 2,4,6-triamino-5-(2-aminophenylthio)pyrimidine, 50 ml. glacial acetic acid, 120 ml. water, and 5 ml. concentrated hydrochloric acid was treated by the procedure of Example 20 to produce 2,4-diamino-1,3-diazaphenothiazine, M.P. 262–264°.

*Example 22*

A mixture of 5 g. 2,4-diamino-6-chloropyrimidine and 15 ml. 1-methylpiperazine was heated on the steam bath for 4 hours. A mixture of ethanol, ether, and ethyl acetate was added. On standing overnight, a product had crystallized. It was then recrystallized from an ethanol-ethyl acetate-benzene mixture, yielding a light powdery solid. This was slurried in a small amount of aqueous sodium hydroxide, filtered, and recrystallized from the above solvent mixture once more, yielding 2,4-diamino-6-(4-methyl-1-piperazinyl)pyrimidine, M.P. 224–225°.

1.5 g. 2,4-diamino-6-(4-methyl-1-piperazinyl)pyrimidine was brominated in 15 ml. glacial acetic acid with 0.37 ml. bromine dissolved in 5 ml. glacial acetic acid. This precipitated a hydrobromide salt of 2,4-diamino-5-bromo-6-(4 - methyl-1-piperazinyl)pyrimidine, which decomposed at 250°. A mixture of 1.4 g. of this product, 0.75 g. 2-amino-4-chlorobenzenethiol hydrochloride, 1.05 g. potassium carbonate, and 10 ml. ethylene glycol was heated at 110–120° under nitrogen for 1.5 hours. After cooling, the solution was clarified and poured into water. The resultant precipitate was recrystallized twice from ethanol, yielding 2,4-diamino-5-(2-amino-4-chlorophenylthio)-6-(4-methyl-1-piperazinyl)pyrimidine as a white monohydrate, M.P. 105–106°.

A mixture of 400 mg. 2,4-diamino-5-(2-amino-4-chlorophenylthio)-6-(4-methyl-1-piperazinyl)pyrimidine, 4 ml. glacial acetic acid, 10 ml. water, and 1.5 ml. 5 N hydrochloric acid was heated on the steam bath for one hour, giving a bright yellow solution. After cooling, the solution was brought to pH 9, yielding a yellow precipitate. This was isolated and recrystallized from ethanol, giving 2-amino-8-chloro-4-(4-methyl - 1 - piperazinyl)-1,3-diazaphenothiazine as light yellow crystals, M.P. 111°.

*Example 23*

15 g. 2-hydroxy-4-benzylaminopyrimidine was dissolved in 150 ml. glacial acetic acid, and 11.9 g. bromine in 25 ml. glacial acetate acid was added dropwise. A clear solution resulted. Upon the addition of ether, a gum precipitated which eventually solidified upon washing with fresh portions of ether. By recrystallization from ethanol there was obtained 4-benzylamino-5-bromo-2-hydroxypyrimidine as the free base, M.P. 192–195°. A mixture of 10.8 g. of this product, plus 6.8 g. 2-amino-4-chlorobenzenethiol hydrochloride, 8.2 g. potassium carbonate, and 120 ml. ethylene glycol was treated by the procedure of Example 20 to produce 5-(2-amino-4-chlorophenylthio)-4-benzylamino - 2 - hydroxypyrimidine which had M.P. 189–191° after recrystallization from an ethanol-ethyl acetate mixture.

A mixture of 1 g. 5-(2-amino-4-chlorophenylthio)-4-benzylamino-2-hydroxypyrimidine, 20 ml. ethanol and 2 ml. concentrated hydrochloric acid was heated under reflux for 9 hours. The product was filtered off and extracted with warm sodium hydroxide, in which it was essentially insoluble. The insoluble residue, which did not melt below 360°, was heated with 7 parts of phosphoryl chloride until it had dissolved. The product was isolated by pouring on ice, neutralizing, and then subliming. There was thus obtained 2,8-dichloro-1,3-diazaphenothiazine, identical in all respects with the product described in the specification of our pending application Ser. No. 123,342.

The mother liquor from the ring closure reaction was made alkaline and extracted with ether. The ethereal solution was found to contain an amine, the tosyl derivative of which had M.P. 111° and was shown to be the tosyl derivative of benzylamine. These facts indicated that the ring closure in hydrochloric acid-ethanol had occurred to yield 8-chloro-2-hydroxy-1,3-diazaphenothiazine, with elimination of benzylamine.

*Example 24*

The reaction of Example 23 was repeated using 1 g. 5-(2-amino - 4 - chlorophenylthio)-4-benzylamino-2-hydroxypyrimidine, 8 ml. acetic acid, 15 ml. water, and 2 ml. concentrated hydrochloric acid. The pyrimidine was much more soluble in this medium than in that of Example 23. After two hours, a yellow precipitate was present, which was isolated and analyzed. This proved to be 8-chloro-2-hydroxy-1,3-diazaphenothiazine, as before.

*Example 25*

2,4,6-triamino - 5 - o - aminophenylthiopyrimidine was heated overnight in 6 equivalents of 0.1 N hydrochloric acid at 94° C. 2,4-diamino-1,3-diazaphenothiazine of excellent quality was obtained in 80% yield.

*Example 26*

To a rapidly stirred suspension of 5.5 g. of 2,4-diamino-6-piperidylpyrimidine in 90 ml. of water at room temperature was added dropwise 4.53 g. of bromine, at a rate such that the bromine color was removed instantaneously. A solution of 2.4 g. of sodium bicarbonate in 30 ml. of water was then added, and after stirring well for ten minutes, the white product was filtered off and dried. Upon recrystallization from ethyl acetate there were obtained pale cream shiny plates of 2,4-diamino-5-bromo-6-piperidylpyrimidine, melting at 155–156°. A mixture of 5.44 g. of this product with 4.31 g. of 2-amino-4-chlorothiophenol hydrochloride, 3.04 g. of potassium carbonate, and 55 ml. of ethylene glycol was heated under nitrogen at 110–120° for one hour. After cooling, the mixture was poured into water, which precipitated a gray solid. This dried to a resinous mass, which was extracted with ether. Upon standing and cooling, the ethereal extract deposited a gray solid, which upon recrystallization from ethanol with the aid of charcoal, yielded white crystals of 2,4-diamino-5-(2 - amino - 4 - chlorophenylthio) - 6 - piperidylpyrimidine, melting at 174–174.5°. To a hot solution of 0.4 g. of this product in 10 ml. of ethanol, was added 0.6 ml. of concentrated hydrochloric acid. The solution immediately turned a bright yellow. The mixture was refluxed for seven hours. Upon chilling, a yellow precipitate separated. This was recrystallized from ethanol, thus yielding yellow crystals of 2-amino-4-piperidyl-8-chloro-1,3-diazaphenothiazine hydrochloride, melting at 214–220° (dec.).

*Example 27*

By the same procedures described above, 2,4,6-triamino-5-(4′,5′-dimethyl-2′-aminophenylthio)pyrimidine (M.P., 223–225°) was cyclized by heating in 0.1 N hydrochloric acid to yield 2,4-diamino-7,8-dimethyl-1,3-diazaphenothiazine which melts with decomposition at 274–276°.

*Example 28*

Similarly, 2-dimethylamino - 4 - hydroxy - 6 - amino-5-(4′-chloro-2′-aminophenylthio)pyrimidine when heated in acid affords an alkali-soluble and an alkali-insoluble product. The former is 2-dimethylamino-4-hydroxy-8-chloro-1,3-diazaphenothiazine.

*Example 29*

A 4% w./v. solution of 2,4-diamino-5-(2-amino-4-chlorophenylthio)-6-(1-piperidyl)pyrimidine in ethanol containing 6% v./v. concentrated aqueous hydrochloric acid was allowed to stand overnight at room temperature, giving an excellent yield of 2-amino-8-chloro-4-(1-piperidyl)-1,3-diazaphenothiazine, yellow crystals, M.P. 214–220° C. (decomp.).

*Example 30*

In similar fashion 2,4-diamino-5-(2-amino-4-chlorophenylthio)-6-(4-morpholinyl)pyrimidine was cyclized to give 2-amino-8-chloro-4-(4-morpholinyl)-1,3-diazaphenothiazine.

*Example 31*

In similar fashion 2,4-diamino-5-(2-amino-4-chlorophenylthio)-6-dimethylaminopyrimidine was cyclized to give 2-amino-8-chloro-4-dimethylamino-1,3-diazaphenothiazine.

*Example 32*

In similar fashion, but employing either a longer time or a higher temperature, 2,4-diamino-5-(2-methylaminophenylthio)-6-(1-piperidyl)pyrimidine was cyclized to give 2-amino-10-methyl-4-(1-piperidyl) - 1,3-diazaphenothiazine.

*Example 33*

A 2.5% w./v. solution of 2,4-diamino-5-(2-amino-4-chlorophenylthio)-6 - (4-methyl-1-piperazinyl)pyrimidine in 0.5 N aqueous hydrochloric acid containing 25% v./v. glacial acetic acid was allowed to stand overnight at room temperature. The solution was then brought to pH 9 giving 2-amino-8-chloro - 4 - (4 - methyl - 1 - piperazinyl) - 1,3-diazaphenothiazine, light yellow crystals, M.P. 111° C.

What we claim is:

1. A method of preparing diazaphenothiazines of the formula:

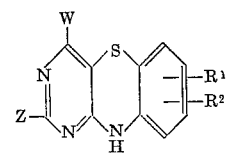

wherein W is selected from the class consisting of lower alkyl, hydroxy, amino, alkylamino, dialkylamino, piperidino, pyrrolidino, morpholino and N′-alkylpiperazino and hydrogen, Z is selected from the class consisting of hydroxyl, mercapto, amino and alkylamino, dialkylamino, piperidino, pyrrolidino, morpholino and N′-alkylpiperazino and $R^1$ and $R^2$ are selected from the class consisting of lower alkyl, halogen and hydrogen which comprises heating in dilute mineral acid at a temperature not substantially above 100° C. a compound of the formula

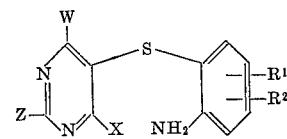

wherein X is selected from the class consisting of amino, monoalkylamino and hydroxyl, provided that when X is hydroxyl W is not amino, and recovering the product.

2. The method of preparing a 1,3-diazaphenothiazine that comprises heating in dilute acid solution at temperatures not substantially exceeding 100° C. a compound of the formula

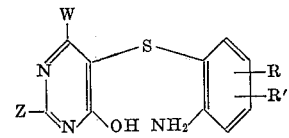

wherein R and R′ are selected from the class consisting of lower alkyl, lower alkoxyl, hydrogen and halogen, W is selected from lower alkyl, hydroxy, and hydrogen and Z is selected from the amino, alkylamino, dialkylamino, piperidino, pyrrolidino, morpholino and N′-alkylpiperazino, hydroxyl and mercapto, and recovering from the reaction-mixture the diazaphenothiazine having the formula

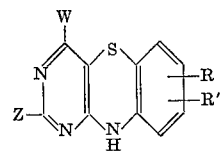

wherein R, R', W, and Z have the values listed above.

3. A method of preparing diazaphenothiazines of the formula:

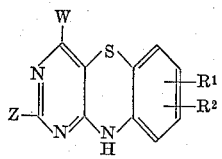

wherein Z is selected from the class consisting of amino, hydroxyl, mercapto and alkylamino, dialkylamino, piperidino, pyrrolidino, morpholino and N'-alkylpiperazino, W is selected from the class consisting of amino, alkylamino, dialkylamino, piperidino, pyrrolidino, morpholino and N'-alkylpiperazino and hydrogen and $R^1$ and $R^2$ are selected from the class consisting of lower alkyl, halogen and hydrogen which comprises heating in dilute mineral acid at a temperature not substantially above 100° C. a compound of the formula

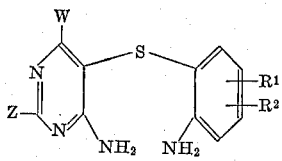

wherein W, Z, $R^1$ and $R^2$ are defined as above, and recovering the product.

4. A method as defined in claim 3 wherein the mineral acid employed is hydrochloric acid.

5. A method as defined in claim 3 wherein the pH of the mixture is about 1.0.

6. A method of preparing diazaphenothiazines of the formula

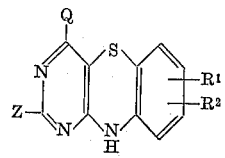

wherein Z is selected from the class consisting of amino, hydroxyl, mercapto, alkylamino, dialkylamino, piperidino, pyrrolidino, morpholino and N'-alkylpiperazino, Q is selected from the class consisting of lower dialkylamino, piperidino, morpholino and alkylpiperazino and $R^1$ and $R^2$ are selected from the class consisting of lower alkyl, halogen and hydrogen which comprises reacting in dilute acid solution a compound of the formula

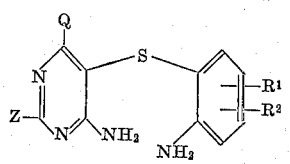

wherein Q, Z, $R^1$ and $R^2$ are defined as above, and recovering the product.

References Cited

UNITED STATES PATENTS 3,200,116  10/1965  Gross et al. _____ 260—243

OTHER REFERENCES

German Auslegeschrift 1,110,651, July 1961.

Druey, Agnew.: Chem., vol. 70, pp. 5 and 10–11 (1958).

Olmstead et al.: J. Org. Chem., vol. 26, pp. 1901–7 (June 1961).

JOHN D. RANDOLPH, *Primary Examiner.*